United States Patent
Beersiek et al.

(10) Patent No.: US 6,326,589 B1
(45) Date of Patent: Dec. 4, 2001

(54) METHOD AND DEVICE FOR TREATING MATERIALS WITH PLASMA-INDUCING HIGH ENERGY RADIATION

(75) Inventors: Jorg Beersiek, Aachen; Wolfgang Schulz, Langerwehe, both of (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/509,033

(22) PCT Filed: Sep. 3, 1998

(86) PCT No.: PCT/DE98/02587
§ 371 Date: Mar. 17, 2000
§ 102(e) Date: Mar. 17, 2000

(87) PCT Pub. No.: WO99/15302
PCT Pub. Date: Apr. 1, 1999

(30) Foreign Application Priority Data

Sep. 19, 1997 (DE) ............................................. 197 41 329

(51) Int. Cl.$^7$ .................................................. B23K 26/03
(52) U.S. Cl. ................................ 219/121.83; 219/121.63
(58) Field of Search ........................ 219/121.63, 121.64, 219/121.83

(56) References Cited

U.S. PATENT DOCUMENTS 5,272,312 * 12/1993 Jurca ................................ 219/121.83
5,869,805 * 2/1999 Beyer et al. ..................... 219/121.83

FOREIGN PATENT DOCUMENTS

| 4434409 | 4/1996 | (DE) . |
| 8-281457 | * 10/1996 | (JP) . |
| 10-6051 | * 1/1998 | (JP) . |

OTHER PUBLICATIONS

High Speed Laser Cutting of Thin Metal Sheets 1994.
SPIE vol. 2207, pp. 96–110.
Prediction of Weld data . . . 1996.
Welding In The World, vol. 38, pp. 369–379.

* cited by examiner

*Primary Examiner*—Geoffrey S. Evans
(74) *Attorney, Agent, or Firm*—Pandiscio & Pandiscio

(57) ABSTRACT

A method for treating materials with plasma-inducing high-energy radiation, especially laser radiation, where an area of vapor capillaries (13) of a work piece (10) is observed with a depth definition detecting device over the entire thickness of the work piece and time-dependent measurement of plasma radiation intensity is carried out. In order to accurately monitor the quality of material treatment, the method is implemented in such a way that the momentary plasma intensities are measured at no less than two measurement points which are parallel to an axis (11) of inducing radiation (12). Predetermined capillary parameters are assigned to the measured plasma intensities and control of the material treatment is conducted depending on the capillary geometric parameters.

13 Claims, 4 Drawing Sheets

METHOD AND DEVICE FOR TREATING MATERIALS WITH PLASMA-INDUCING HIGH ENERGY RADIATION

The invention relates to a method involving procedural steps for treating materials by means of plasma-inducing radiation.

Treating materials with plasma-inducing high-energy radiation, such as laser or electron radiation, requires on-line regulation and monitoring for quality during its application. It is desirable to optimize the treatment process. Optical and acoustic signals from the treatment area have therefore long been used for purposes of quality control. For example, the degree of root penetration which can be a qualitative characteristic for the complete welding of a work piece can be determined by observing the underside of the work piece or by lateral observation of the treatment area. To do so, optical detectors are employed to determine center frequencies based on the optical intensity values, from which the degree of root penetration can in turn be inferred. However, both these methods are indirect and fraught with errors.

A method involving the procedural steps referred to initially is known from DE 44 34 409 C1. These steps relate to a direct process. The observation of the vapor capillary area of the work piece takes place in the axis of the inducing laser radiation. Based on the observation of the plasma radiation emission, a mean value of the intensity is determined and used as a measurement for the depth of penetration. This method makes it necessary to adjust the measuring device relative to the axis of the plasma-inducing laser radiation. Because a mean value is produced, the resulting observation results are of a summary nature so that the observational accuracy and its dependent analysis, as well as the process control of the material treatment which in turn is a function of the latter, appear in need of improvement.

The invention therefore is founded upon the objective of improving a method involving the procedural steps referred to initially in order to enhance the control of the material treatment process and to prevent process defects to a significant degree by means of direct and improved process observation.

In this invention, it is first of all important to dispense with the idea of forming a mean value when analyzing the intensities of the plasma radiation. It is, however, essential that the momentary plasma intensities be analyzed at several points of the observation area of the vapor capillaries. It has been shown that the plasma intensity observed at a measurement point is directly related to the formation of the vapor capillaries. In principle, it is thus possible to determine the momentarily appearing shape of the vapor capillaries or at least the parameters of this shape by observing the treatment area pixel-by-pixel or point-by-point. The plasma intensities are measured point-by-point and parallel to the axis of the inducing radiation. The shape of the vapor capillaries or their parameters, i.e. the capillary geometric parameters allow for an immediate assessment of the quality of treatment, inasmuch as a high-quality treatment is reflected by the shape of the vapor capillaries and/or the capillary geometric parameters. The capillary geometric parameters of predetermined treatment tasks are known for their predetermined treatment qualities. Conversely, based on the capillary geometric parameters measured it is thus possible to draw inferences as to the treatment quality that is actually present. This makes it unnecessary to constantly adjust the measuring device to the axis of the inducing radiation. The capillary geometric parameters obtained by this method are employed in the control of the material treatment process. In this way, a point-by-point analysis of the momentary plasma intensities facilitates at least a partial representation of the capillaries. Their formation and/or their extent is a measure for a treatment parameter—as is the laser radiation output or the rate of feed-which influences the control of the material treatment.

The ablation depression which results when materials are treated with plasma-inducing high-energy radiation essentially extends in the direction of the axis of the inducing radiation or parallel thereto. This is a necessary requirement if one is to penetrate as deeply as possible into the work piece. In order to obtain this desirable deep penetration, it is of advantage if the process is accomplished using a capillary depth as a capillary geometric parameter. The momentary depth of the vapor capillaries in all places of the treatment area is directly connected to the process parameters which determine the treatment quality. The treatment quality is deficient if, for example, the capillary depth is not as great as specified while a work piece is being treated.

The treatment result can be further enhanced by determining the shape of the vapor capillaries based on a great number of capillary geometric parameters, on which the control of the material treatment is then based. The comprehensive determination of the momentary shape of the vapor capillaries makes it possible to accurately predict the treatment quality. For example, when a direct and comprehensive observation of the momentary vapor capillaries is effected, treatment defects that have occurred or are in the process of developing can be directly observed. Melting bath ejections during laser beam welding of aluminum are but one example. Any partial closing of the vapor capillaries is shown directly, and if the geometrical data derived from this representation are correctly converted, the process can be controlled such that the particular treatment defect is prevented. It is possible to optimize this type of process control if the shape of the vapor capillaries is determined as a whole. However, if the vapor capillaries are determined only partially or if only a few capillary geometric parameters are determined, a correspondingly more limited process control is also possible.

The vapor capillary extends at different capillary depths, both in the axis of the inducing radiation and parallel thereto; radially to the aforementioned axis it has different radial measurements with different depth ranges. These, too, can be utilized as capillary geometric parameters; this is possible to best advantage especially when the shape of the vapor capillaries is fully determined. However, a simpler method results when the length of the opening of the vapor capillaries in the direction of the feed is used as a capillary geometric parameter. This length of the opening of the vapor capillaries in the feed direction is significant because, together with the capillary depth, it determines the aspect ratio, i.e. the ratio of the aforementioned length to the capillary depth. A sufficiently large aspect ratio permits the unobstructed escape of the vapor from the vapor capillaries into the environment, which stabilizes the process. Executing this procedure based on a predetermined length of the vapor capillary opening in the feed direction yields qualitatively sufficient treatment results if one proceeds on the premise that the welding depth remains constant in many treatment tasks and that it can be established by assigning a predetermined value to the linear energy, i.e., through the ratio between the laser beam output and the rate of feed. In a special case, the length of the vapor capillary opening in the direction of the feed obviously has a special significance as a capillary geometric parameter. This is because when a work piece is welded through, the capillary form immediately becomes significantly slimmer since a large part of the energy being beamed in penetrates the vapor capillaries and thus is no longer available to the fusing of materials. The aforementioned length is reduced accordingly, allowing any root penetration to be instantly determined by observation parallel to the axis of the inducing radiation.

In many material treatment process it is sufficient to determine the required energy, it being unnecessary to make adjustments while the treatment is in progress. To do so, the linear energy is determined, i.e. the ratio between the laser beam output and the rate of feed. The linear energy represents a predetermined welding depth which-or rather the capillary depth-grows monotonously as the linear energy increases. Dynamic processes in the welding area often need not be considered during material treatments of this kind, especially in the presence of an aspect ratio sufficient to let the vapors escape from the capillaries unhindered. Welding defects, such as pores, usually do not appear during such a process. However, when welding tasks of greater complexity such as the welding of contours must be performed, the process parameters must be controlled during material treatment. During this control, the laser beam output and/or the rate of feed are usually changed. The process described in this invention, in which measurements of the momentary plasma intensities are taken parallel to the axis of the inducing radiation, revealed that the combined, time-resolved observation of the position of the vapor capillaries and their extent allows the rate of feed and the laser beam output to be monitored separately. Owing to the length of the opening of the vapor capillaries in the direction of the feed and the capillary depth, they both increase monotonously in the same direction while the laser beam output also grows monotonously. This is not the case with the rate of feed. As the rate of feed increases monotonously, the capillary length does indeed grow monotonously; however, the welding depth, or rather the capillary depth, drops monotonously.

Based on the preceding understanding, the process can be executed in such a way that the laser beam output is regulated as a function of the length of the opening of the vapor capillaries which changes in the same direction as the capillary depth.

Moreover, the process can be executed in such a way that the feed rate is regulated as a function of the length of the opening of the vapor capillaries which changes in a direction opposite to the capillary depth.

In neither of the preceding cases is it necessary for the process parameters of the laser beam output or, respectively, the feed rate for the material treatment, to be predetermined. They can in fact be determined during the treatment.

The two process options described above need not be used simultaneously. For example, controlling the laser beam output at a fixed rate of feed can suffice if only a predetermined area of the capillary length and the capillary depth need to be maintained, but not fixed values of the capillary length and the capillary depth.

Of significance for the material treatment, however, is not only the length of the opening of the vapor capillaries in the direction of the feed—i.e., the capillary length—, but also the width of the vapor capillaries transversely to the direction of the feed—i.e., the capillary width. If the capillary width becomes too small, for instance, the material treatment must be controlled appropriately. Thus, the process can also be done in such a way that the width of the opening of the vapor capillaries transversely to the direction of the feed is employed as a capillary geometric parameter.

The invention further refers to a device for treating material by means of plasma-inducing high-energy radiation. Regarding this device the object of the invention is to improve the device such that the material treatment can be controlled so as to prevent process defects to a large extent by means of improved, direct process observations and using enhanced means of control.

The above-described device utilizes a [point of] observation that is coaxial to the laser beam axis. While the optical axis of this observation corresponds to the laser beam axis, actual observation of the momentary intensities of the treatment area takes place next to this optical laser beam axis in each case. Due to the fact that this observation or measurement is effected laterally, it is in principle also possible to measure the greatest capillary depth which, as a rule, is not located in the laser beam axis, but rather refers to the direction of the feed at the rear. This makes it unnecessary to constantly adjust the detectors in the axis of the inducing radiation.

A very simple embodiment of the device involves detectors in the shape of apertured diaphragms. Process conditions can be measured using just two such apertured diaphragms, since each apertured diaphragm observes, or rather measures, only one point of the reciprocal action zone of the treatment area or of the vapor capillaries.

It is advantageous to design the device such that a first apertured diaphragm is arranged in the direction of feed and a second apertured diaphragm is arranged transversely to the direction of feed, and in both cases outside of the inducing radiation axis. Falling below certain intensity values of the plasma radiation can affect the control of the material treatment.

Measuring the formation of the vapor capillaries is enhanced if at least one line camera is present to cover the vapor capillary area. A line camera is equipped with a great number of detectors, all arranged in one line. Accordingly, a line camera is preferably arranged in the direction of the feed and/or transversely to the feed direction on top of the treatment area of the work piece. This observation, effected by means of the line camera outside of the optical axis and parallel thereto, provides a great number of measurements, that number being determined by the number of detectors in the line camera.

A further enhancement of the observation of the treatment area or the vapor capillaries is attained by means of a device equipped with an image generator which creates an image of the entire vapor capillary area and resolves the data into measurement points which can be evaluated individually. The accuracy of the values measured is a function of the number of analyzable measurement points, i.e., of the number of detectors with which the image generator is equipped and which are arranged on the plane.

In particular, the device can be designed such that it incorporates a CCD camera, a photodiode or a photoelectric multiplier array as the image generator. The aforementioned image generators have been shown to perform reliably in the optical monitoring of material treatment processes using plasma-inducing high-energy radiation, and are suitable for their known uses, such as the timing control of image monitoring and automatic intensity adjustments.

The invention is explained by means of drawings as follows.

Figure 1:
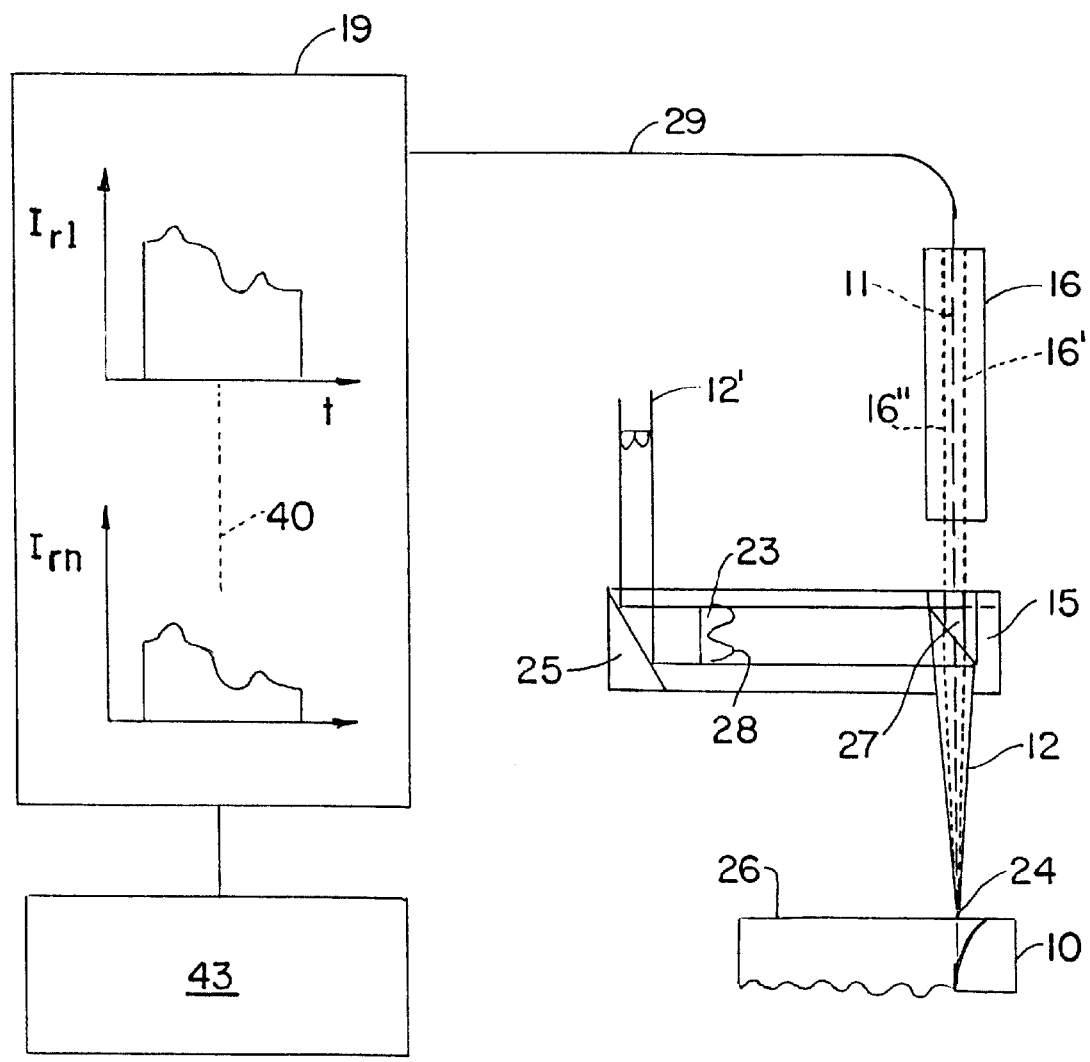
FIG. 1 shows a schematic representation of a device for observing a work piece as it is being treated with laser beams.

FIG. 1 shows a schematic representation of a work piece 10 being treated with a focusing laser radiation 12. The material treatment involved may include welding, cutting, drilling, ablation or remelting work, depending on how the laser being used is employed. The laser radiation 12' emitted by the laser not shown) is directed to a focusing mirror 15 by means of a deviation mirror 25 which focuses the laser radiation 12 onto the work piece 10. As an example, the focus 24 is on the work piece surface 26. The focusing mirror 15 is a perforated mirror whose hole 27 is arranged within the ring maximum 28 of the laser radiation 12 which has a ring mode 23. The hole 27 has a clearance to allow for observing the work piece surface 26 in the area of the focus 24 of the work piece 10. A measuring device 16, which in FIG. 1 is shown only schematically, is used to observe the treatment area of the work piece surface 26. By way of example, two detectors 16',16" in the form of apertured diaphragms are being used. FIG. 1 does not show these detectors 16',16" in detail, but merely in terms of their measuring direction. The measurement then is not taken in the axis 11 of the plasma-inducing laser radiation, but rather at a distance parallel thereto. The readings taken during the treatment and/or the light absorbed by the measuring device are transmitted to an evaluation unit 19 via a line 29, such as a light guide in the event the treatment process uses a Nd:YAG laser. The evaluation unit 19 shows that the intensity I of the plasma radiation is measured as a function of time t. The measurement is taken several times, i.e. at the locations determined by the detectors 16',16". Accordingly, the treatment area is measured on a point-by-point basis. Thus, the evaluation unit 19 records and shows the dependency $I_{r1}$ (t), i.e. for a first measurement point r1. There follows a further representation $I_m$ (t). This shows that the intensity of the plasma radiation as a function of time t is measured at a further measurement point m. The measurement points r1, r2 to m are appropriately arranged depending on the treatment task. The row of points 40 symbolizes that a great number of measurement points can be used, depending upon the measuring device 16 being employed. While the measuring device 16 can have detectors in the form of apertured diaphragms, it can also take the form of any other suitable type of element capable of generating images or measurements. These include line cameras, CCD cameras, and photo diode or photoelectric multiplier arrays. Depending on the particular type of measuring instrument used to analyze the measurement points, there are a correspondingly large number of measurement points generated which can be evaluated.

The evaluation unit 19 is connected to a control device 43 which processes the data provided by the evaluation unit 19. The data provided pertain to capillary geometric parameters calculated by the evaluation unit 19 based on reference values previously fed into it, i.e. on the basis of the known capillary geometric parameters for the treatment task at hand.

Figure 2:
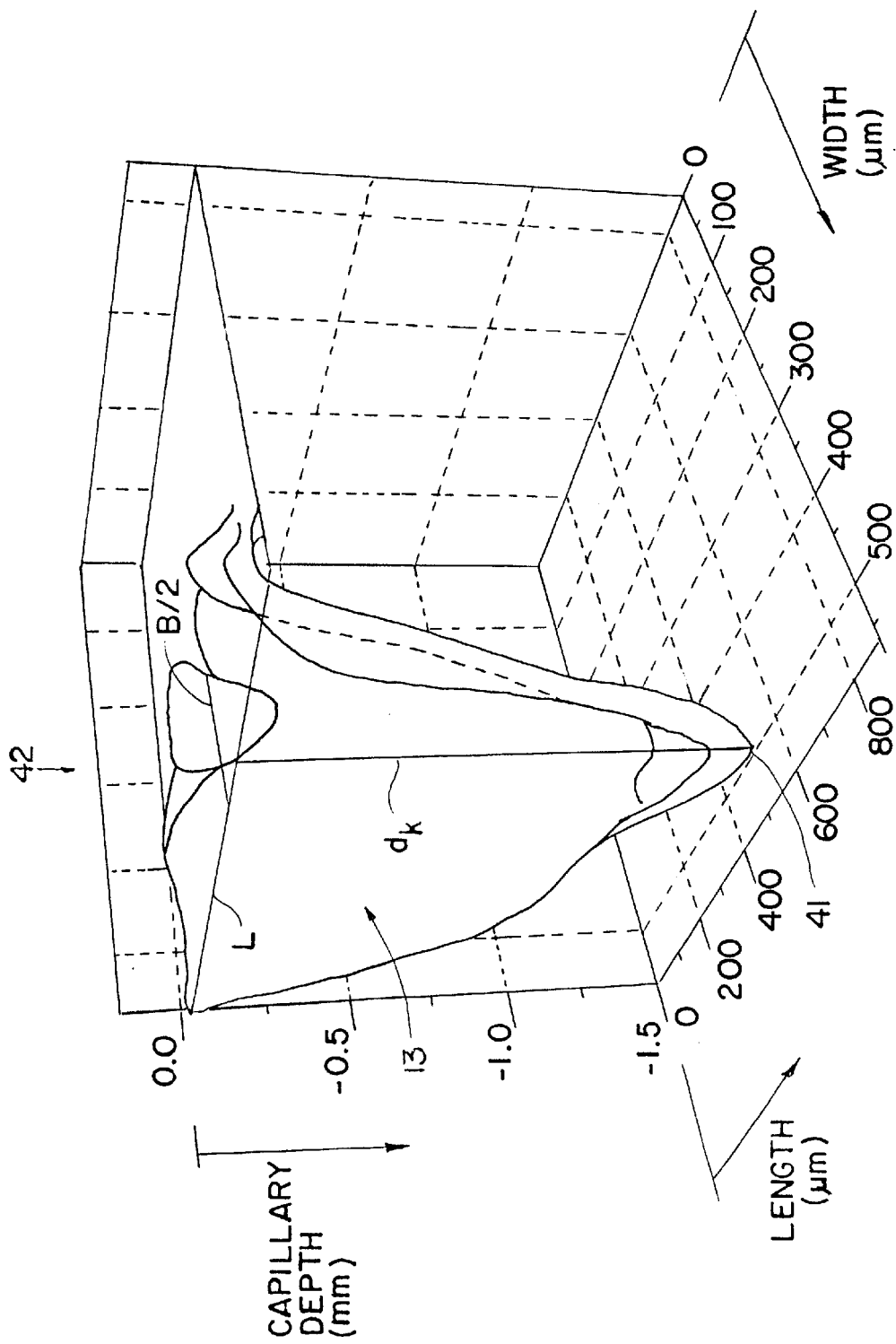
FIG. 2 shows a section through a vapor capillary during a welding-on process.

It has been shown that the shape of the vapor capillaries and/or the shape of the ablation depression in the treatment area can be measured with more or less accuracy using processes capable of generating images or measurement points. FIG. 2 shows a three-dimensional longitudinal view of a vapor capillary during the welding process on a work piece. It shows the indicated length in the feed direction and the indicated width transversely to the feed direction. The capillary depth $d_K$ or, respectively, the welding depth varies in the direction of the measurement 42 depending on the formations in the reciprocal action zone which obey the laws of physics. A complete representation of the vapor capillaries is possible only if the observation of the entire treatment area is done with sufficient precision, i.e. if the observation involves a sufficient number of measurement points. It is then possible to see, for instance, that there is a clearance between the apex 41 of the vapor capillaries and the beam axis or, respectively, the optical axis 42. This is a function of the relative feed of the laser radiation 12 and the dynamic processes which occur in the vapor capillary.

The capillary depths, the lengths and the width of the vapor capillaries must be considered to be capillary geometric parameters capable of completely describing the shape of the vapor capillaries. All of them can be measured by means of a point-by-point observation parallel to the optical axis 42, in a manner that is chronologically precise according to the design of the measuring device. A less complete measurement of the shape of the vapor capillaries suffices also, i.e. by using selected capillary geometric parameters such as the maximum capillary depth $d_k$, the capillary length L—that is to say, the length of the opening of the vapor capillaries in the direction of the feed through the measuring axis 42—, as well as the width B of the opening of the vapor capillaries 13 transversely to the direction of the feed, as measured through the measuring axis 42. The aforementioned capillary geometric parameters $d_k$, L and B or, respectively, B/2 are shown in FIG. 2.

Figure 3:
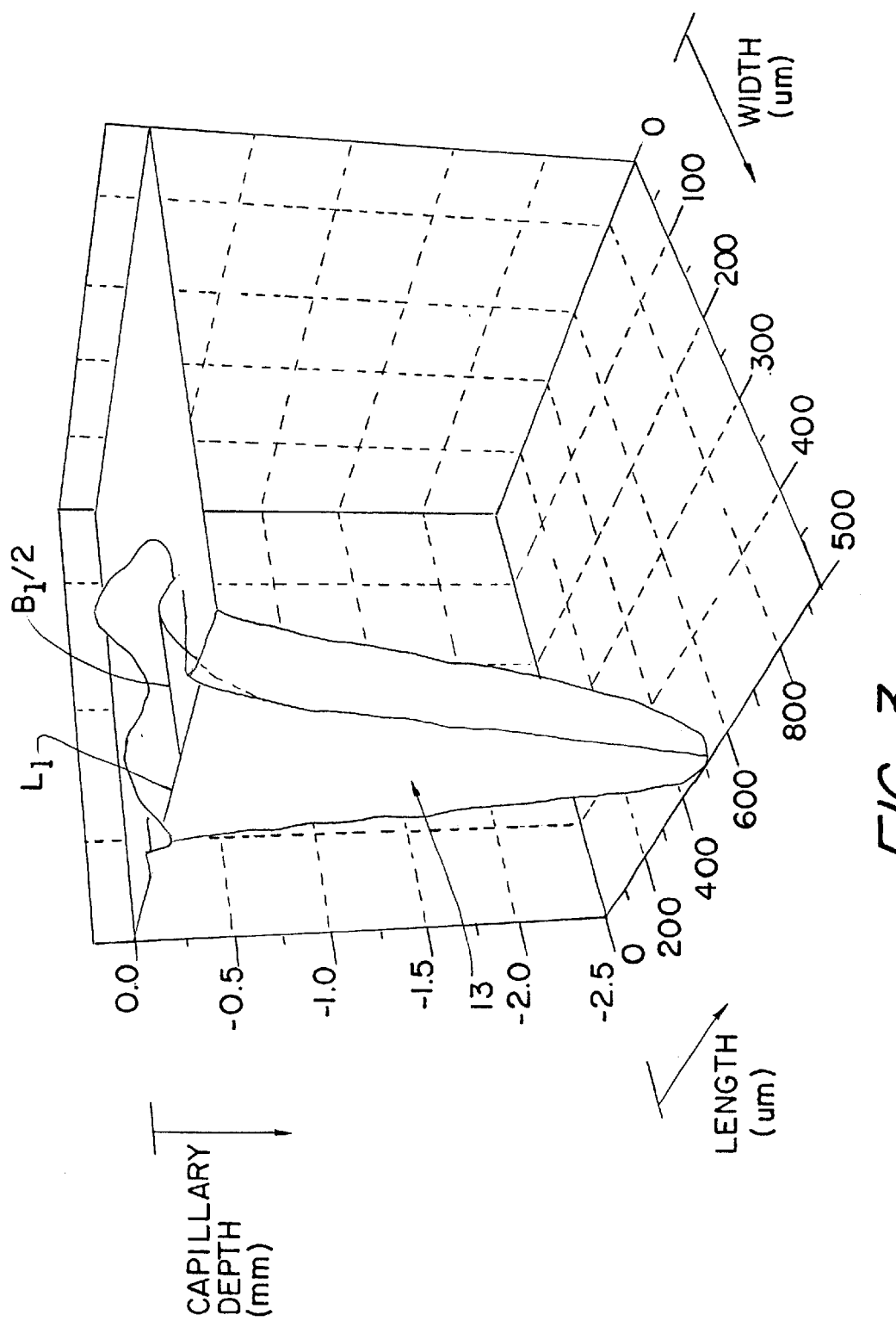
FIG. 3 shows a section through a vapor capillary during root penetration welding.

FIG. 3 shows a vapor capillary 13 formation which deviates from that shown in FIG. 2. This is due to root penetration which causes the work piece to at least partly extend all the way through in the direction of the irradiation. Part of the laser radiation is thus beamed through the work piece, making it unavailable for excitation and thus for fusing the material. As a result, the vapor capillary 13 is much slimmer. The length L1 therefore is smaller than the capillary length L with which it must be compared. Accordingly, the width $B_1/2$ is also smaller. As a result and as the comparison between FIGS. 2 and 3 reveals, it is possible during laser beam welding to determine the difference between in-welding and root penetration based on the expansion of the vapor capillaries at least in the direction in which the material is treated.

When high-energy radiation is employed, and in particular laser radiation, slight deviations of the process parameters can cause significant variations in the treatment results. Any minor changes in the laser beam output, rate of feed, focus position, etc. can thus influence the welding depth and with it the capillary depth, the fusion structure, and the process stability. This is why direct observation of the manufacturing process during material treatment is so important. The treatment parameters as well as freely arising process parameters can be monitored. Beyond the determination of root penetration which has already been discussed, the method also allows defects which occur during material treatment to be observed directly, such as melting bath ejections during laser beam welding of aluminum or the partial closing of the ablation depression. If the capillary geometric parameters are correctly converted, the treatment parameters can be controlled and/or regulated to avoid treatment defects.

It has already been shown that time-resolved measurements of the geometry, or rather the shape, of the vapor capillaries are possible. Characteristic frequencies which indicate the natural movement of the vapor capillaries can be inferred on the basis of the time resolution. An appropriate assessment of these movements or, respectively, of the changing shapes of the vapor capillaries can be used to control the process parameters, causing the reciprocal action zone or, respectively, the vapor capillaries to be stabilized. This allows the ablation to be uniform and prevents welding errors such as pores. Stabilizing the ablation prevents the dynamics of the gaseous phase from being transferred to the melting bath, which would otherwise cause fluctuations in the molten mass and lead to process defects.

It has already been pointed out that the shape of the vapor capillaries is a function of the treatment parameters, essentially of the laser beam output and the feed rate. Accordingly, the shape of the vapor capillaries can also be considered a measurement value for these treatment parameters and employed in their control.

This is based on the understanding that the laser beam output and the feed rate have different effects on the formation of the vapor capillaries. By way of explanation, this is based on the premise that the laser beam output and the feed rate together create the concept of linear energy. Linear energy is the ratio between the laser beam output $P_L$ and the rate of feed v. As the linear energy grows, the capillary depth increases monotonously. In many material treatment processes it suffices to synchronize the linear energy with the treatment task. But it can often be advantageous to take the dynamic effects of the natural reaction of the ablation depression and/or the vapor capillaries into account. Important for the dynamic behavior of the vapor capillaries is the aspect ratio which is a function of the length L of the capillary opening in the direction of the feed, i.e. the capillary length, and the depth $d_k$ of the vapor capillaries. The following equation thus applies: $A=L/d_k$. A large aspect ratio A permits the vapors to escape from the vapor capillaries into the environment unobstructed, causing the process to stabilize.

Figure 4:
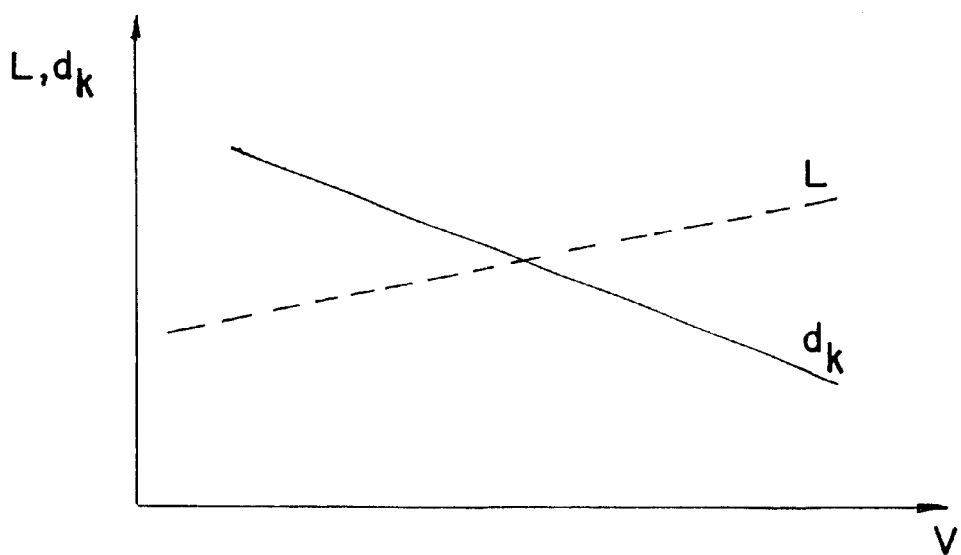
FIG. 4 shows the capillary length and the capillary depth as a function of the rate of feed.
Figure 5:
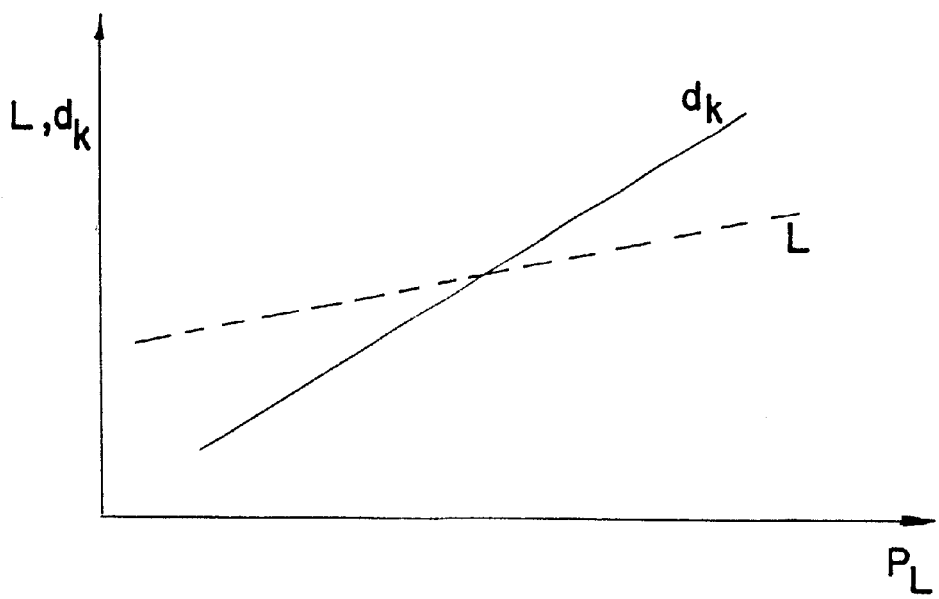
FIG. 5 shows the capillary length and the capillary depth as a function of the laser beam output.

FIGS. 4 and 5 show the dependency of the capillary length L and the capillary depths $d_K$ on the feed rate v on the one hand, and on the laser beam output $P_L$ on the other hand. It will be seen that the capillary length L grows monotonously with v, while the capillary depth $d_k$ falls monotonously as the feed rate v increases. This is different with the laser beam output $P_L$, for as it grows, the capillary length L increases, as does the capillary depth $d_k$.

The capillary length L of the capillary opening can now be metrologically determined. It is not a function of the linear energy $P_L/v$, but rather grows monotonously with the output $P_L$ and the rate of feed v. The aspect ratio $A=L/d_k$ can be determined.

Controlling the laser beam output $P_L$ and the feed rate v can be accomplished by simultaneously setting both a desired capillary depth $d_k$ and an aspect ratio A (which is required for a stable welding process). The value of the capillary depth $d_k$ is determined by the linear energy $P_L/v$. The aspect ratio A is determined by the laser beam output $P_L$ or the feed rate v itself. If the material treatment is controlled or regulated, the process parameters $P_L$ and v need not be predetermined, but can advantageously be determined while the treatment is in progress. It is not necessary to have any knowledge of the predetermined dependencies $P_L=P_L(L,d_K)$ and $v=v(L,d_K)$. The monotonous behavior of the capillary geometric parameters L and $d_k$ in relation to $P_L$ and v is sufficient to regulate the process parameters $P_L, V$.

The capillary length L is a function of the local depth. Thus, the aspect ratio $A=A(z_0)=L(z_0/d_k)$, which determines the stability of the treatment, is also a function of the local depth $z_0$. The choice of the depth $z_0$ at which the aspect ratio is determined depends on the material treatment task at hand.

In the event non-defined values for the capillary geometric parameters L and $d_k$ must be obtained because it is sufficient if the treatment result remains within a predetermined range of these parameters, controlling the material treatment based on the laser beam output $P_L$ and a fixed feed rate v may suffice.

It is important for the result of material treatment that even the capillary width B does not fall below a minimum value. In addition to the capillary length L, it is therefore necessary to also measure the capillary length B. Whichever of the two capillary geometric parameters L or B is the first to become critical determines the possible range for the laser beam output $P_L$ and for the feed rate v in which a stable welding process can take place. By measuring the capillary width B and the capillary length L it is possible to decide which parameters will turn critical first. If B becomes unstable, the laser beam output $P_L$ must be reduced.

What is claimed is:

1. A method for treating materials by plasma-inducing laser radiation in which an area of vapor capillaries (13) of a work piece (10) is observed with a depth definition detection device over the entire thickness of the work piece and time-dependent measurements of plasma radiation intensity are performed, wherein momentary plasma intensities are measured at no less than two measurement points parallel to an axis (11) of inducing radiation (12) and wherein the plasma intensities measured are assigned to predetermined capillary geometric parameters, and wherein the material treatment process is controlled as a function of the capillary geometric parameters.

2. The method according to claim 1, wherein a capillary depth ($d_K$) comprises one of the capillary geometric parameters.

3. The method according to claim 2, wherein the shape of the vapor capillaries (13) is determined based on a great number of the capillary geometric parameters and provides a basis for the control of the material treatment process.

4. The method according to claim 3, wherein the length (L) of the opening of the vapor capillaries (13) in the feed direction serves as one of the capillary geometric parameters.

5. The method according to claim 4, wherein the laser beam output ($P_L$) is regulated as a function of the length (L) of the opening of the vapor capillaries (13) which changes in the same direction as the capillary depth ($d_k$).

6. The method according to claim 5, wherein the rate of feed (v) is regulated as a function of the length (L) of the opening of the vapor capillaries (13) which changes in a direction opposite to the capillary depth ($d_k$).

7. The method according to claim 4, wherein a width (B) of the opening of the vapor capillaries (13) transverse to a direction of the feed is used as one of the capillary geometric parameters.

8. A device for treating materials using plasma-inducing laser radiation focused on a work piece (10) by focusing devices, and having a measuring device (16) which observes an area of vapor capillaries (13) of the work piece (10) by a depth definition detection device which covers the entire thickness of the work piece and measures intensities of the radiation as a function of time, and having an evaluation unit that is connected to the measuring device (16) which analyzes the radiation intensities measured relative to predetermined reference values, to execute a process for treating materials, said device comprising not less than two detectors (16',16") which take readings parallel to an axis (11) of inducing radiation (12) and measure momentary plasma intensities which are assigned to predetermined capillary geometric parameters, as a function of which the material treatment is controlled.

9. The device according to claim 8, wherein the detectors (16',16") are apertured diaphragms.

10. The device according to claim 9, wherein a first of the apertured diaphragms is arranged in a feed direction and a second of the apertured diaphragms is arranged transversely to the feed direction, each outside of the axis (11) of the inducing radiation (12).

11. The device according to claim 8, wherein at least one line camera is present to cover the area of the vapor capillaries (13).

12. The device according to claim 8, wherein an image generator is present, capable of producing an image of the entire area of the vapor capillaries (13) and of resolving the image generated into individually analyzable measurement points.

13. The device according to claim 12, wherein a selected one of a CCD camera, a photo diode, and a photoelectric multiplier array is present.

* * * * *